A. T. SCHYLLANDER.
TIRE.
APPLICATION FILED SEPT. 21, 1916.
1,306,724.
Patented June 17, 1919.
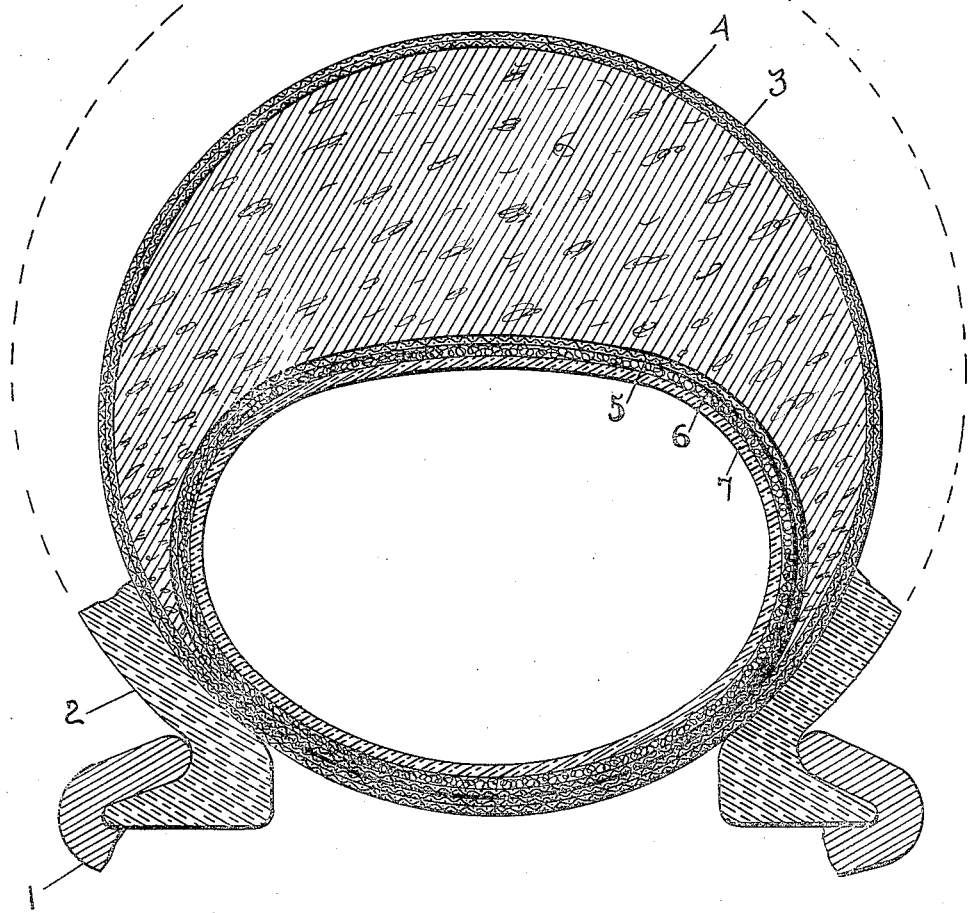
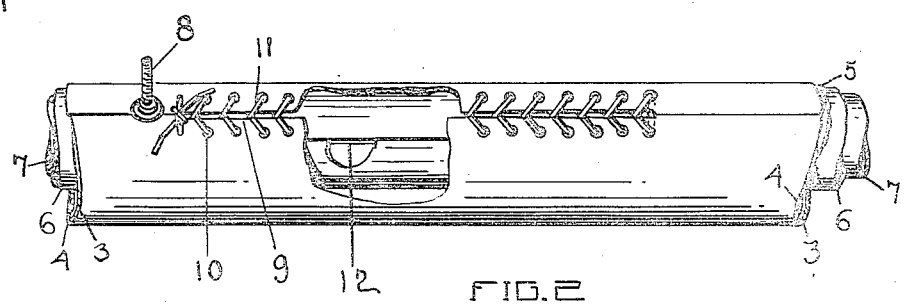
Inventor
Alfred T Schyllander
By
Attorney

UNITED STATES PATENT OFFICE.

ALFRED T. SCHYLLANDER, OF TOLEDO, OHIO, ASSIGNOR OF ONE-HALF TO CHARLES E. ADAMSON, OF TOLEDO, OHIO.

TIRE.

1,306,724.     Specification of Letters Patent.     Patented June 17, 1919.

Application filed September 21, 1916. Serial No. 121,346.

*To all whom it may concern:*

Be it known that I, ALFRED T. SCHYLLANDER, a citizen of the United States of America, residing at Toledo, Lucas county, Ohio, have invented new and useful Tires, of which the following is a specification.

This invention relates to resilient load carrying devices.

This invention has utility when incorporated in tires, especially for the wheels of motor vehicles for travel upon highways.

Referring to the drawings:

Figure 1 is a section through an embodiment of the device as adapted to a motor vehicle tire, parts being broken away; and Fig. 2 is a side elevation of a fragment of the casing inclosing means of the device.

The wheel rim 1 may retain the casing 2 as normally used for pneumatic tires. Disposed in this casing is the inner tube comprising the outer fabric or canvas envelop 3 inclosing the yieldable crescent-shaped composition filler 4 which is a cast body housed between the fabric 3 and the inner fabric envelop 5, which envelops may be of heavy canvas.

Embraced by these envelops 3 and 5, in a chamber of this tubular section not occupied by this yieldable filler 4, is the felt armor 6 housing the pneumatic tube 7, which may, to advantage, be of the two end type having the inflation providing valve stem 8, disposed adjacent the slot 9 in the envelops 3 and 5, provided with eyelets 10 engaged by the lacing 11. In closing the tube 7 in this unit, the felt flap 12 protects the rubber tube 7 from the eyelets 10.

This yielding body 4, even on deflation of the pneumatic tube 7, is of such mass as to preclude crushing down of the casing upon the rim or for injuring the casing or the pneumatic tube 7. Further, the disposal and grouping of the armors and envelops is such that the structure affords effective resistance against punctures or objectionable wear.

The yielding composition 4 provides a resistance as well as distance means against the entrance of puncture causing substances. The envelops 3 and 5 of canvas provide woven resistance while the felt armor 6 is further effective as resistance to penetration. Accordingly, the rubber tube 7 may be of long life and well protected against injury in a tire and the casing may not be subjected to severe crumpling, all contributing to the length of life of the tire and incidentally to the reduction in upkeep of the tire and vehicle.

In the use of the device hereunder the resistance cast or composition 4 is disposed between the canvas envelop 3 and the canvas envelop 5. This article may be the article of sale or in addition thereto the felt armor 6 may be included. In practice the double ended inner tube 7 may be inserted deflated in this unit device 3, 4, 5, 6, laced up in such inner tube protector, the unit disposed in the casing and then inflated. The deflation of the tube 7 permits ready insertion of this unit in the casing.

What is claimed and it is desired to secure by Letters Patent is:

A casing, and a tire inner tube unit for ready removable mounting in said casing, said unit embodying a pneumatic section, an enveloping felted section, a first fabric envelop therefor, a yieldable protector of crescent shape in cross section, said protector embracing the pneumatic section and first fabric envelop, and a second fabric envelop for the felted section, first fabric envelop, pneumatic and protector sections, said second envelop having an entrance opening permitting assembling of the sections longitudinally therethrough, and closure means for the opening to maintain assembly of the tire unit for mounting in the casing.

In witness whereof I affix my signature.

ALFRED T. SCHYLLANDER.